(12) United States Patent
Zhuang et al.

(10) Patent No.: US 11,196,553 B2
(45) Date of Patent: Dec. 7, 2021

(54) COMMAND TRANSMISSION METHOD AND APPARATUS, ELECTRONIC DEVICE

(71) Applicant: Bitmain Technologies Inc., Beijing (CN)

(72) Inventors: Zhong Zhuang, Beijing (CN); Fuyi Liu, Beijing (CN); Yihao Peng, Beijing (CN)

(73) Assignee: Bitmain Technologies Inc., Beijing (CN)

( * ) Notice: Subject to any disclaimer, the term of this patent is extended or adjusted under 35 U.S.C. 154(b) by 76 days.

(21) Appl. No.: 16/832,551

(22) Filed: Mar. 27, 2020

(65) Prior Publication Data

US 2020/0228330 A1 Jul. 16, 2020

Related U.S. Application Data

(63) Continuation of application No. PCT/CN2018/108556, filed on Sep. 29, 2018.

(30) Foreign Application Priority Data

Sep. 29, 2017 (CN) .......................... 201710910377.4

(51) Int. Cl.
*H04L 9/08* (2006.01)
*H04L 9/06* (2006.01)
*H04L 9/32* (2006.01)

(52) U.S. Cl.
CPC .......... *H04L 9/0861* (2013.01); *H04L 9/0643* (2013.01); *H04L 9/0822* (2013.01); *H04L 9/3239* (2013.01)

(58) Field of Classification Search
CPC ... H04L 9/0861; H04L 9/0643; H04L 9/0822; H04L 9/3239; H04L 2209/56;
(Continued)

(56) References Cited

U.S. PATENT DOCUMENTS

2008/0148042 A1* 6/2008 Brown ..................... H04L 63/06
713/154
2014/0298042 A1* 10/2014 Ogura ..................... H04L 9/0894
713/193

(Continued)

FOREIGN PATENT DOCUMENTS

| CN | 1423451 A | 6/2003 |
|---|---|---|
| CN | 1831834 A | 9/2006 |

(Continued)

OTHER PUBLICATIONS

Chinese Office Action dated Sep. 11, 2020, in connection with corresponding CN Application No. 201710910377.4 (17 pp., including machine-generated English translation).

(Continued)

*Primary Examiner* — Mohammed Waliullah
(74) *Attorney, Agent, or Firm* — Maier & Maier, PLLC

(57) ABSTRACT

A command transmission method and apparatus, and an electronic device. The command transmission method includes: acquiring, by a control terminal, an encryption key according to a present time; generating, by the control terminal, an encrypted control command by encrypting the control command using the encryption key; and transmitting the encrypted control command to a computing device.

10 Claims, 11 Drawing Sheets

(58) Field of Classification Search
CPC ..... H04L 9/0872; H04L 9/16; H04L 2209/38; H04L 9/0863; H04L 9/3297
See application file for complete search history.

(56) References Cited

U.S. PATENT DOCUMENTS

| | | | |
|---|---|---|---|
| 2017/0046652 | A1 | 2/2017 | Haldenby et al. |
| 2018/0212780 | A1* | 7/2018 | Talamonti ............. H04L 9/3247 |
| 2018/0302461 | A1* | 10/2018 | Xu ........................ H04L 67/025 |

FOREIGN PATENT DOCUMENTS

| | | | |
|---|---|---|---|
| CN | 101299752 | A | 11/2008 |
| CN | 101330379 | A | 12/2008 |
| CN | 101651508 | A | 2/2010 |
| CN | 101894282 | A | 11/2010 |
| CN | 102724207 | A | 10/2012 |
| CN | 104852800 | A | 8/2015 |
| CN | 105933318 | A | 9/2016 |
| CN | 107038383 | A | 8/2017 |
| CN | 107171791 | A | 9/2017 |
| CN | 107819572 | A | 3/2018 |
| WO | 2017/147503 | A1 | 8/2017 |

OTHER PUBLICATIONS

International Search Report and Written Opinion of the International Searching Authority dated Dec. 29, 2018 in corresponding International application No. PCT/CN2018/108556; 7 pages.
Chinese Office Action dated Mar. 2, 2020 in corresponding Chinese application No. 201710910377.4; 9 pages.

* cited by examiner

COMMAND TRANSMISSION METHOD AND APPARATUS, ELECTRONIC DEVICE

CROSS-REFERENCE TO RELATED APPLICATIONS

This application is a continuation of International Application No. PCT/CN2018/108556, filed on Sep. 29, 2018, which claims the priority benefit of Chinese Patent Application No. 201710910377.4, filed on Sep. 29, 2017. The contents of the above identified applications are incorporated herein by reference in their entireties.

FIELD

The present disclosure relates to the field of information technology, and in particular, to a command transmission method, apparatus, and an electronic device.

BACKGROUND

With the continuous development of information technology, blockchain has been under rapid development as a new technology. Blockchain technology originated from the bitcoin technology that emerged in 2008 and is the underlying technology of Bitcoin. A blockchain refers to a chain of blocks generated by cryptographic methods. The block data in each block in the blockchain is associated with the block data in the previous block. In order to ensure the prompt generation of the blocks in the blockchain and the accuracy of the data in the block, computing devices are generated in the data sharing system of the blockchain technology. A computing device refers to one or more mining machines, which are computers used to mine blockchain data. The computing devices monitor the shared broadcast in the data sharing system using P2P (Peer to Peer) networks, confirm the shared broadcast, and generate a block containing the shared broadcast. When the above tasks are completed, the computing devices can be used to earn a processing fee for accelerating the processing of shared broadcast and additional digital currency.

In related art, a computing device is remotely controlled by the user on the control terminal. The user issues a control command to the computing device through the control terminal. When the computing device receives the control command, it executes the control command.

Because the user remotely controls the computing device through the control terminal, a malicious user can also send a control command to the computing device through other control terminals. The computing device cannot confirm whether the received control command has been tampered with, in which case the computing device may be controlled by a malicious user. This can affect the computing device's normal operations and reducing its processing efficiency.

SUMMARY

The present disclosure provides a command transmission method, apparatus, and an electronic device to improve the computing device's capacity to confirm whether the received control command is authentic.

In embodiments of the present disclosure, a control terminal may be used to manage the transmission of the control command. The control terminal may be implemented as one or more computing apparatuses, each having a memory for storing executable instructions and a processor for communicating with the memory to execute the executable instructions. The control terminal may be connected to the blockchain network and communicate with one or more computing devices.

According to a first aspect of certain embodiments of the present disclosure, a command transmission method is provided. The method includes: acquiring an encryption key according to a present time by the control terminal; generating an encrypted control command by the control terminal by encrypting the control command based on the encryption key; transmitting the encrypted control command to a computing device.

In certain embodiments, acquiring the encryption key according to the present time includes: determining the present time when a user request to send a control command is detected; determining an initial encryption key according to the present time; and generating the encryption key based on a first algorithm and the initial encryption key, where the first algorithm includes at least a hash algorithm.

In certain embodiments, before transmitting the encrypted control command to the computing device, the method further includes adding a time stamp to the encrypted control command by the control terminal. Correspondingly, transmitting the encrypted control command to the computing device includes transmitting the encrypted control command and the time stamp to the computing device.

In certain embodiments, the method further includes triggering the computing device to decrypt the encrypted control command and execute the control command.

In certain embodiments, the method further includes: receiving an invalidity notification from the computing device indicating that the computing device fails to decrypt the encrypted control command, where the invalidity notification carries a command identifier of the encrypted control command that has failed to be decrypted; determining a specified control command according to the command identifier carried in the invalidity notification, where the specified control command is a control command carried in the encrypted control command that has failed to be decrypted; encrypting the specified control command to generate a specified encrypted control command; and transmitting the specified encrypted control command to the computing device to cause the computing device to decrypt the specified encrypted control command and execute the specified control command carried by the specified encrypted control command.

According to a second aspect of certain embodiments of the present disclosure, a command transmission method is provided. The method is implemented on a computing device for obtaining a control command. The method includes: acquiring a decryption key by the computing device when receiving an encrypted control command, where the encrypted control command carries a control command, and the encrypted control command is generated by a control terminal and transmitted to the computing device; decrypting the encrypted control command based on the decryption key; and acquiring the control command and executing the control command when the encrypted control command is successfully decrypted based on the decryption key.

In certain embodiments, acquiring the decryption key by the computing device when receiving an encrypted control command includes: determining a receiving time when the encrypted control command is received; acquiring an initial decryption key according to the receiving time; and process the initial decryption key to generate the decryption key according to a second algorithm, where the second algorithm includes at least a hash algorithm.

In certain embodiments, the method further includes: determining an initial decryption key according to the time stamp carried in the encrypted control command; and generating the decryption key according to a second algorithm and the initial decryption key, where the second algorithm includes at least a hash algorithm.

In certain embodiments, the method further includes: determining a target period corresponding to the receiving time when the encrypted control command fails to be decrypted using the decryption key; acquiring a specified decryption key corresponding to a precedent period of the target period; decrypting the encrypted control command based on the specified decryption key; executing the control command when the decryption is successful; returning an invalidity notification to the control terminal, when the decryption fails, to inform the control terminal to send the encrypted control command again, where the invalidity notification carries a command identifier of the encrypted control command that has failed to be decrypted.

According to a third aspect of certain embodiments of the present disclosure, an electronic device for transmitting a control command to a computing device is provided. The device includes: at least one processor; and a memory, communicably connected with the at least one processor, for storing instructions executable by the at least one processor. The execution of the instructions by the at least one processor causes the at least one processor to: acquire an encryption key according to a present time; generate an encrypted control command by encrypting the control command using the encryption key; and transmit the encrypted control command to the computing device.

In certain embodiments, execution of the instructions by the at least one processor causes the at least one processor further to: determine the present time when a request to send the control command is detected; determine an initial encryption key according to the present time; and generate the encryption key based on a first algorithm and the initial encryption key, where the first algorithm includes at least a hash algorithm.

In certain embodiments, execution of the instructions by the at least one processor causes the at least one processor further to: add a time stamp to the encrypted control command before transmitting the encrypted control command to the computing device and transmit the encrypted control command and the time stamp to the computing device.

In certain embodiments, execution of the instructions by the at least one processor causes the at least one processor further to trigger the computing device to decrypt the encrypted control command and execute the control command.

In certain embodiments, execution of the instructions by the at least one processor causes the at least one processor further to: receive an invalidity notification from the computing device indicating that the computing device fails to decrypt the encrypted control command, where the invalidity notification carries a command identifier of the encrypted control command that has failed to be decrypted; determine a specified control command according to the command identifier carried in the invalidity notification, where the specified control command is a control command carried in the encrypted control command that has failed to be decrypted; encrypt the specified control command to generate a specified encrypted control command; and transmit the specified encrypted control command to the computing device to cause the computing device decrypt the specified encrypted control command, and perform the specified control command carried by the specified encrypted control command.

A fourth aspect of the embodiments of the present disclosure provides an electronic device for obtaining a control command. The device includes: at least one processor; and a memory, communicably connected with the at least one processor, for storing instructions executable by the at least one processor. Execution of the instructions by the at least one processor causes the at least one processor to: acquire a decryption key when receiving the encrypted control command, where the encrypted control command carries a control command, and the encrypted control command is generated by a control terminal; decrypt the encrypted control command based on the decryption key; acquire the control command and execute the control command when the encrypted control command is successfully decrypted based on the decryption key.

In certain embodiments, execution of the instructions by the at least one processor causes the at least one processor further to: determine a receiving time when the encrypted control command is received; acquire an initial decryption key according to the receiving time; and process the initial decryption key to generate the decryption key according to a second algorithm, where the second algorithm includes at least a hash algorithm.

In certain embodiments, execution of the instructions by the at least one processor causes the at least one processor further to: determine a target period corresponding to the receiving time when the encrypted control command fails to be decrypted using the decryption key; acquire a specified decryption key corresponding to a precedent period of the target period; decrypt the encrypted control command based on the specified decryption key; execute the control command when the decryption is successful; and return an invalidity notification to the control terminal, when the decryption fails, to inform the control terminal to send the encrypted control command again, where the invalidity notification carries a command identifier of the encrypted control command that has failed to be decrypted.

In certain embodiments, the encrypted control command further carries a time stamp, and execution of the instructions by the at least one processor causes the at least one processor further to: determining an initial decryption key according to a time stamp carried in the encrypted control command; and generating the decryption key according to a second algorithm and the initial decryption key, where the second algorithm includes at least a hash algorithm.

According to a fifth aspect of certain embodiments of the present disclosure, a system for transmitting and executing a control command is provided. The system includes a control terminal and a computing device. The control terminal includes a first processor and a first memory. The first memory stores a first set of instructions for being executed by the first processor, and the first set of instructions perform a command encryption and transmission method, the method including: acquiring an encryption key according to a present time, generating an encrypted control command by encrypting the control command using the encryption key, and transmitting the encrypted control command to the computing device. The computing device includes a second processor and a second memory. The second memory stores a second set of instructions for being executed by the second processor, and the second set of instructions perform a command decryption and execution method, the method including: receiving the encrypted control command, acquiring a decryption key, acquiring the control command by decrypting the encrypted control command using the decryption key, and when the encrypted control command is successfully decrypted, executing the control command.

According to a sixth aspect of certain embodiments of the present disclosure, a command transmission apparatus is provided. The apparatus is applied to a control terminal, and includes: an acquisition module, configured to acquire an encryption key according to a present time; a generation module, configured to generate an encrypted control command by encrypting a control command using the encryption key; a transmission module, configured to transmit the encrypted control command to a computing device, to cause the computing device to decrypt the encrypted control command and execute the control command.

In certain embodiments, the acquisition module includes: a first determining submodule, configured to determine the present time when a user request to send a control command is detected; a second determining submodule, configured to determine an initial encryption key according to the present time; a generation submodule, configured to generate the encryption key based on a first algorithm and the initial encryption key, where the first algorithm includes at least a hash algorithm.

In certain embodiments, the apparatus further includes a supplementing module, configured to add a time stamp to the encrypted control command before transmitting the encrypted control command to the computing device. Correspondingly, the transmission module is further configured to transmit the encrypted control command and the time stamp to the computing device.

In certain embodiments, the apparatus further includes: a receiving module, configured to receive an invalidity notification from the computing device indicating that the computing device fails to decrypt the encrypted control command, where the invalidity notification carries a command identifier of encrypted control command that has failed to be decrypted; a determining module, configured to determine a specified control command according to the command identifier carried in the invalidity notification, where the specified control command is a control command carried in the encrypted control command that has failed to be decrypted; where the generation module is further configured to encrypt the specified control command to generate a specified encrypted control command; and the transmission module is further configured to transmit the specified encrypted control command to the computing device to cause the computing device decrypt the specified encrypted control command, and perform the specified control command carried by the specified encrypted control command.

According to a seventh aspect of certain embodiments of the present disclosure, a command transmission apparatus is provided. The apparatus is applied to a computing device, and includes: an acquisition module, configured to acquire a decryption key when receiving an encrypted control command, where the encrypted control command carries a control command, and the encrypted control command is generated by a control terminal; a decryption module, configured to decrypt the encrypted control command based on the decryption key; an execution module, configured to acquire the control command and execute the control command when the encrypted control command is successfully decrypted based on the decryption key.

In certain embodiments, the receiving module includes: a determining submodule, configured to determine a receiving time when the encrypted control command is received; an acquisition submodule, configured to acquire an initial decryption key according to the receiving time; and a generation submodule, configured to process the initial decryption key to generate the decryption key according to a second algorithm, where the second algorithm includes at least a hash algorithm.

In certain embodiments, the apparatus further includes: a first determining module, configured to determine an initial decryption key according to a time stamp carried in the encrypted control command; and a generation module, configured to generate the decryption key according to a second algorithm and the initial decryption key, where the second algorithm includes at least a hash algorithm.

In certain embodiments, the apparatus further includes: a second determining module, configured to determine a target period corresponding to the receiving time when the encrypted control command fails to be decrypted using the decryption key; where the acquisition module is further configured to acquire a specified decryption key corresponding to a precedent period of the target period, and decrypt the encrypted control command based on the specified decryption key; and the execution module is further configured to execute the control command when the decryption is successful; a return module, configured to return an invalidity notification to the control terminal, when the decryption fails, to inform the control terminal to send the encrypted control command again, where the invalidity notification carries a command identifier of the encrypted control command that has failed to be decrypted.

According to an eighth aspect of the embodiments of the present disclosure, an electronic device including any of the command transmission apparatuses of the above sixth aspect is provided.

According to a ninth aspect of the embodiments of the present disclosure, an electronic device is provided. The device includes a memory for storing executable instructions and a processor for communicating with the memory to execute the executable instructions to perform the operations of any of the command transmission methods in the above first aspect.

According to a tenth aspect of the present disclosure, an electronic device is provided. The electronic device includes any of the command transmission apparatuses in the seventh aspect.

According to an eleventh aspect of the embodiments of the present disclosure, an electronic device is provided which includes a memory for storing executable instructions and a processor for communicating with the memory to execute the executable instructions to perform the operations of any of the command transmission methods in the above second aspects.

According to a twelfth aspect of the embodiments of the present disclosure, a control system is provided. The system includes the electronic device of the foregoing eighth aspect and the electronic device of the foregoing tenth aspect.

The technical solutions provided in the embodiments of the present disclosure may include the following beneficial effects: acquiring an encryption key according to a present time, and encrypting a control command by using the encryption key, generating an encrypted control command, transmitting the encrypted control command to a computing device to cause the computing device to decrypt the encrypted control command and execute the control command, which makes the encryption key change over time. In embodiments of the present disclosure, a malicious user cannot easily decrypt the encrypted control command by using a fixed password. The computing device would not be easily controlled by the malicious user, which ensures the normal operations of the computing device. The processing efficiency of the computing device is improved.

The above general description and the following detailed description are intended to be illustrative and not restrictive.

BRIEF DESCRIPTION OF THE DRAWINGS

The present disclosure can be more clearly understood from the following drawings, in which.

DETAILED DESCRIPTION OF THE EMBODIMENTS

Figure 1:
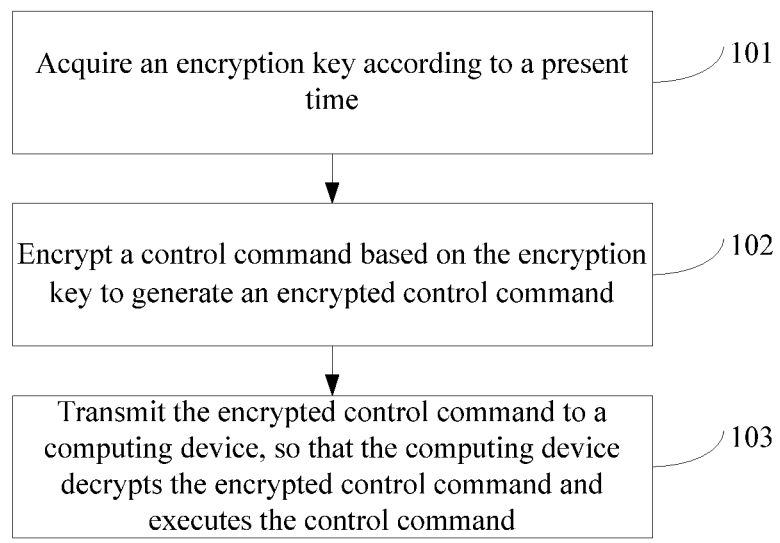
FIG. 1 is a flowchart of a command transmission method according to an exemplary embodiment.

Exemplary embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

It should also be understood that, for the convenience of description, the size of various parts shown are not drawn to scale in the present disclosure.

In some cryptocurrency mining networks, a user may remotely send control commands to control a computing device through a control terminal, where the computing device may be a mining node in the crypto currency mining system. The present disclosure provides a command transmission method and apparatus to improve the computing device's capacity to verify whether the received control command is authentic. Instead of sending the control command directly to the computing device for execution, the control terminal may receive the control command, acquire an encryption key according to a present time, generate an encrypted control command by encrypting the control command using the encryption key, and transmit the encrypted control command to the computing device. The encrypted control command is decrypted, and the encryption key can change over time.

The control terminal may be implemented as one or more computing apparatuses, each having a memory for storing executable instructions and a processor for communicating with the memory to execute the executable instructions. The control terminal may be connected to the blockchain network and communicate with one or more computing devices. In some embodiments, the control terminal may be a server computer. In other embodiments, the control terminal may be an authorized user terminal.

When the computing device receives the encrypted control command, the computing device may acquire the decryption key. The computing device may decrypt the encrypted control command based on the decryption key. The decryption key is based on the time when the control command is sent. When the encrypted control command is successfully decrypted based on the decryption key, the computing device acquires the control command and executes the control command.

In certain embodiments, when a decryption fails at the computing device, the computing device may send an invalidity notification to the control terminal. The invalidity notification carries a command identifier of the encrypted control command that has failed to be decrypted. The control terminal may determine a specified control command based on the command identifier. Then the control terminal may encrypt the specified control command to generate a specified encrypted control command and transmit the specified encrypted control command to the computing device, so that the computing device can decrypt the specified encrypted control command.

An embodiment of the present disclosure provides a command transmission method, which is implemented on a control terminal for transmitting a control command to a computing device and includes: acquiring an encryption key according to a present time; encrypting the control command based on the encryption key to generate an encrypted control command; and transmitting the encrypted control command to the computing device.

FIG. 1 is a flowchart of a command transmission method according to an exemplary embodiment. As shown in FIG. 1, a control terminal executing the command transmission method includes the following steps. In step 101, the control terminal may acquire an encryption key according to a present time. In step 102, the control terminal may encrypt a control command based on the encryption key to generate an encrypted control command In step 103, the control terminal may transmit the encrypted control command to a computing device, so that the computing device may decrypt the encrypted control command, and execute the control command.

In certain embodiments, the control terminal may acquire the encryption key according to the present time, encrypt the control command based on the encryption key to generate the encrypted control command, and transmit the encrypted control command to the computing device. The computing device may decrypt the encrypted control command and execute the control command. The encryption key can change over time. A malicious user cannot easily decrypt the encrypted control command by using a fixed password, and the computing device is not easily controlled by the malicious user, thereby ensuring the normal operations of the computing device and improving its processing efficiency.

In certain embodiments, acquiring the encryption key according to the present time may include: determining the present time when a user request to send a control command is detected; determining an initial encryption key according to the present time; and generating the encryption key based on a first algorithm and the initial encryption key. The first algorithm includes at least a hash algorithm.

In certain embodiments, before transmitting the encrypted control command to the computing device, the method may further include adding a time stamp to the encrypted control command Correspondingly, transmitting the encrypted control command to the computing device includes transmitting the encrypted control command and the time stamp to the computing device.

In certain embodiments, the method may further include: receiving an invalidity notification from the computing device, where the invalidity notification is sent by the computing device after the encrypted control command fails to be decrypted, and the invalidity notification carries a command identifier of the encrypted control command that has failed to be decrypted; determining, according to the command identifier of the invalidity notification, a specified control command, and the specified control command is a control command carried in the encrypted control command that has failed to be decrypted; encrypting the specified control command to generate a specified encrypted control command; and transmitting the specified encrypted control command to the computing device to cause the computing device to decrypt the specified encrypted control command and execute the specified control command carried by the specified encrypted control command.

Figure 2:
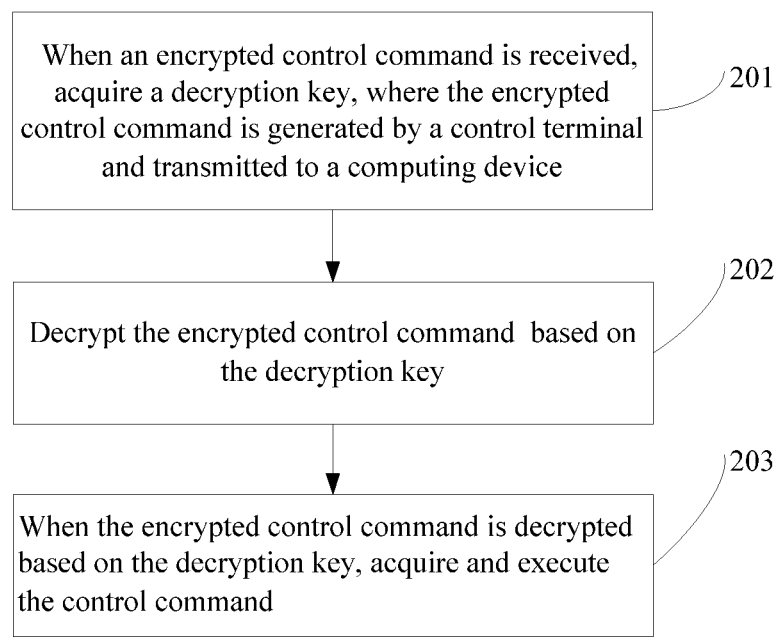
FIG. 2 is a flowchart of a command transmission method according to an exemplary embodiment.

FIG. 2 is a flowchart of a command transmission method according to an exemplary embodiment. As shown in FIG. 2, the method is used on a computing device, and the method includes the following steps.

In step 201, when an encrypted control command is received, the computing device may acquire a decryption key. The encrypted control command carries a control command and is generated by a control terminal and transmitted to the computing device.

In step 202, the computing device may decrypt the encrypted control command based on the decryption key.

In step 203, when the encrypted control command is successfully decrypted based on the decryption key, the computing device may acquire the control command and execute the control command.

In certain embodiments, when receiving the encrypted control command, the computing device may decrypt the encrypted control command by using the decryption key, acquire the control command, and execute the control command, so that the computing device only executes the control command that has been successfully decrypted. As a result, the computing device is not easily controlled by malicious users, ensuring the normal operations of the computing device and improving the processing efficiency of the computing device.

In certain embodiments, when the computing device receives the encrypted control command, acquiring the decryption key may include: when receiving the encrypted control command, determining a receiving time of the encrypted control command; acquiring an initial decryption key according to the receiving time; and based on a second algorithm, processing the initial decryption key to generate the decryption key. The second algorithm includes at least a hash algorithm.

In certain embodiments, the method may further include: when receiving the encrypted control command and a time stamp, determining an initial decryption key based on the time stamp; based on a second algorithm, processing the initial decryption key to generate the decryption key. The second algorithm includes at least a hash algorithm.

In certain embodiments, the method may further include: when the decryption of the encrypted control command fails based on the decryption key, determining a target period corresponding to the receiving time of the encrypted control command; acquiring a specified decryption key corresponding to a precedent period of the target period; decrypting the encrypted control command based on the specified decryption key; when the encrypted control command is successfully decrypted based on the specified decryption key, executing the control command; when the encrypted control command fails to be decrypted based on the specified decryption key, returning an invalidity notification to the control terminal, so that the control terminal sends an encrypted control command to the computing device again according to the received invalidity notification, where the invalidity notification carries the command identifier of the encrypted control command that has failed to be decrypted.

All of the above optional technical solutions may be combined to form an optional embodiment of the present disclosure, and are not described herein again.

Figure 3:
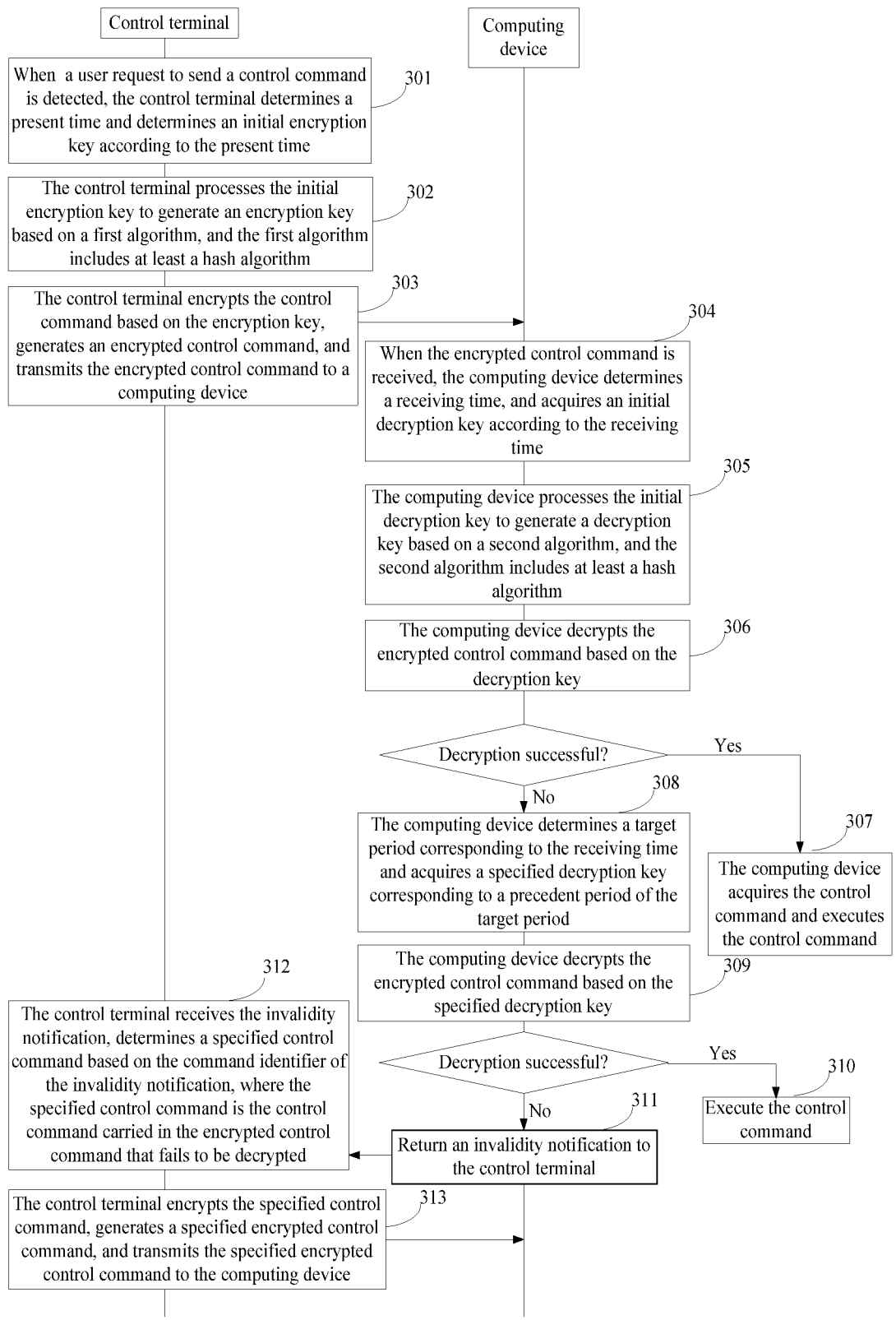
FIG. 3 is a flowchart of a command transmission method according to an exemplary embodiment.

FIG. 3 is a flowchart of a command transmission method according to an exemplary embodiment. As shown in FIG. 3, the method includes the following steps.

In step 301, when a user request to send a control command is detected, the control terminal may determine a present time, and determine an initial encryption key according to the present time.

In embodiments of the present disclosure, the control terminal may be a user terminal such as a computer, a server, and is configured to send a control command to the computing device in the data sharing system, so that the computing device executes the control command Since the computing device does not have a universal deployment standard, in order to address the difference between the computing device hardware and the computing device communication protocols from different manufacturers, the control terminal can be divided into an active control terminal and a passive control terminal. The active control terminal receives a control command from the user, and the active control terminal sends the control command to the passive control terminal. The passive control terminal shields different attributes of different computing devices, and uniformly configures the command for the computing device of each manufacturer to determine the initial encryption key to encrypt the control command. As such, when receiving the encrypted control command, the computing device would be able to decrypt the control command regardless of the difference in the attributes of computing devices of different manufacturers.

For computing devices and control terminals in the same network, the time of the computing device may be consistent with the time of the control terminal, and therefore, the encryption key and the decryption key can be generated according to the time value. This ensures that the encryption key and the decryption key can change over time, and also ensures that the encryption key and the decryption key are symmetric keys, improving the security of the control command transmission, and reducing the failure rate of the computing device using the decryption key for decryption.

In order for the initial encryption key determined by the control terminal to match the initial decryption key determined by the computing device after receiving the encrypted control command, a shared key may be pre-set in the corresponding control terminal and the computing device. The shared key for the control terminal and the computing device is not the same for different users. Since the control terminal generates the initial encryption key according to the present time, and the time is continuously changed, the generated initial encryption key may be a one-time key, and the initial encryption key can be obtained by performing the following Equation 1:

$$\text{Truncate}(HMAC\text{-}SHA\text{-}1(K, C)), C = \frac{(T - T_0)}{X} \quad \text{(Equation 1)}$$

In Equation 1, Truncate is an initial encryption key; K is a shared key of the control terminal; C is a time parameter, T is a present time, To is a constant, usually 0, and X is a step constant, usually 30 seconds and can be set differently in certain cases. The value of X is not specifically limited in the present disclosure; HMC-SHA-1 is a keyed hash algorithm constructed from a SHA1 hash function and is used as the HMAC Truncate method.

In the HMAC Truncate method, when the HMC-SHA-1 algorithm is executed, a string of 20 bytes in length can be obtained, and the 4th bit of the last byte in the string is used as an offset. Four bytes are obtained starting at the offset position. An integer is formed by placing the upper bytes in the sequence at the lower storage address and placing the lower bytes in the sequence at the higher storage address, i.e., using the big-endian format. The initial encryption key is obtained as the last 6 bits of the integer, and thus the Truncate key is obtained.

It should be noted that, in order to avoid that each time the user requests the control terminal to send a control command to the computing device, an initial encryption key is generated, resulting in an excessive workload, identical predetermined time intervals can be configured for the control terminal and the computing device, so that only when the predetermined time interval is detected, the control terminal generates a new initial encryption key, and the computing device generates a new initial decryption key. For example, the predetermined time interval can be set to 5 minutes, so that the control terminal regenerates the initial encryption key every 5 minutes, and the computing device regenerates the initial decryption key every 5 minutes.

In step 302, the control terminal may process the initial encryption key to generate an encryption key based on a first algorithm, and the first algorithm includes at least a hash algorithm.

Since the initial encryption key generated in step 301 is short and the generation process is fixed, the initial encryption key may be relatively easy to be cracked. In order to improve the security of the control command transmission, the control terminal may use a first algorithm to process the initial encryption key to obtain a long sequence key, use the long sequence key as the encryption key, and encrypt the control command using the long sequence key subsequently.

Since the control terminal may correspond to the computing device, in order to ensure that the computing device can also generate a long sequence key as the decryption key, the same hash salt can be set for the corresponding control terminal and the computing device. The decryption key in the form of a long sequence key generated subsequently by the computing device is corresponding to the encryption key generated in this step, which improves the success rate of the computing device for decrypting the encrypted control command. The first algorithm may be a PBKDF2 algorithm, and the PBKDF2 algorithm applies a pseudo-random function, so that a long sequence key can be generated. When the first algorithm is the PBKDF2 algorithm, the long sequence key may be generated by using the following Equation 2:

$$DK = PBKDF2(\text{Truncate}, S, c, dk\text{Len}) \quad \text{(Equation 2)}$$

where DK is a long sequence key; Truncate is the initial encryption key; S is the hash salt; c is the number of iterations, usually a positive integer constant; and dkLen is the length of the long sequence key, which can usually be set by the user.

It should be noted that, in order to simplify the transmission process of the control command, the content shown in step 302 may not be executed, and the control terminal may directly use the determined initial encryption key as the encryption key to encrypt the control command In other words, after step 301 is completed, the control terminal directly executes step 303. The manner in which the encryption key is generated is not specifically limited to the specific embodiments of the present disclosure.

In step 303, the control terminal encrypts the control command based on the encryption key, generates an encrypted control command, and transmits the encrypted control command to the computing device.

In certain embodiments, the control command may be a miner restart command, a miner sleep command, a miner standby command, and so on. After the control terminal determines the encryption key, the control terminal may encrypt the control command using the encryption key, generate an encrypted control command, and transmit the encrypted control command to the computing device. Since there may be a one-to-one correspondence between the control terminal and the computing device, when the control terminal transmits the encrypted control command, the control terminal may directly transmit the encrypted control command to the corresponding computing device.

In order to enable the computing device to more accurately determine the decryption key when receiving the encrypted control command and to avoid the failure of decrypting the encrypted control command, the control terminal may add a time stamp to the encrypted control command and transmit the encrypted control command and the time stamp to the computing device, so that the computing device may directly determine the decryption key corresponding to the time stamp, and decrypts the encrypted control command based on the decryption key.

In step 304, when the encrypted control command is received, the computing device determines the receiving time of the encrypted control command, and acquires an initial decryption key according to the receiving time.

In certain embodiments, when the computing device receives the encrypted control command, since there is a corresponding relationship between the computing device and the control terminal, the computing device also pre-sets a shared key. In addition, the computing device and the control terminal within the network have the same time, therefore, based on the receiving time and the shared key of the received encrypted control command, the computing device can generate an initial decryption key that is consistent with the initial encryption key. The computing device may generate the initial decryption key using Equation 1. The process is consistent with the steps shown in step 301, and details are not repeated herein. The manner in which the initial decryption key is generated is not specifically limited to the specific examples of these embodiments.

It should be noted that, since the control terminal may add a time stamp to the encrypted control command when transmitting the encrypted control command, and the time stamp may directly determine the initial decryption key, the computing device may detect whether there is a time stamp when it receives the encrypted control command. If the time stamp is detected, the computing device may determine the initial decryption key directly based on the time stamp; if no time stamp is detected, the computing device may generate the initial decryption key using Equation 1.

The computing device may set a time stamp-key list for storing a correspondence between a time stamp and an initial decryption key as shown in Table 1. The time stamp-key list may be updated on a daily basis. The initial decryption key corresponding to each time stamp for the day is set, so that after receiving the time stamp, the computing device can directly determine the initial decryption key according to the time stamp without further calculation, reducing the workload of the computing device.

TABLE 1

| time stamp | initial decryption key |
| --- | --- |
| 1506415881 | KH2J9-PC326 |
| 1506415886 | TFP9Y-VCY3P |
| 1506415891 | 236TW-X778T |
| . . . | . . . |

In step 305, the computing device may process the initial decryption key to generate a decryption key based on a second algorithm, and the second algorithm includes at least a hash algorithm.

In certain embodiments, the second algorithm may be the same hash algorithm as the first algorithm. The computing device may perform the operation on the initial decryption key based on the second algorithm, and the process of generating the decryption key is consistent with the process shown in the foregoing step 302, and the details are not described herein.

It should be noted that, if the control terminal uses the initial encryption key when encrypting the control command, the computing device can directly use the initial decryption key to decrypt the encrypted control command, without using a second algorithm to operate on the initial decryption key.

In step 306, the computing device may decrypt the encrypted control command based on the decryption key. When the decryption of the encrypted control command based on the decryption key is successful, the computing device may perform step 307 described at the following. When the decryption of the encrypted control command fails, the steps 308 and 309 as described in the following may be performed.

In certain embodiments, when the computing device decrypts the encrypted control command based on the decryption key and the encrypted control command is successfully decrypted, the control command may be acquired and executed, that is, step 307 is performed. The network where the control terminal and the computing device are located may cause a delay in receiving the encrypted control command by the computing device due to the signal difference, etc., which may cause the computing device to receive an incorrect decryption key at the receiving time according to the received encrypted control command, and fail to decrypt the encrypted control command In this scenario, the computing device needs to perform the following steps 308 and 309.

It should be noted that if the computing device can successfully decrypt the encrypted control command, the following steps 308 to 313 need not to be performed. The acquired control command can be executed directly.

In step 307, when the decryption of the encrypted control command based on the decryption key is successful, the computing device may acquire the control command and execute the control command.

In certain embodiments, when the computing device decrypts the encrypted control command successfully based on the decryption key, the computing device can acquire the control command and perform the corresponding operation according to the control command.

In step 308, when the encrypted control command fails to be decrypted based on the decryption key, the computing device may determine the target period corresponding to the receiving time of the encrypted control command and acquire a specified decryption key corresponding to a precedent period of the target period.

In certain embodiments, after the computing device fails to decrypt the encrypted control command based on the decryption key, in the scenario where there is a delay in the network, the decryption key corresponding to the precedent period may be used for the decryption attempt, that is, to use the specified decryption key to decrypt the encrypted control command. When acquiring the specified decryption key, the computing device may determine the target period corresponding to the receiving time, and determine the precedent period of the target period. Then the computing device uses the decryption key corresponding to the precedent period as the specified decryption key. It should be noted that if the predetermined time period is set on the computing device and the control terminal, and the encryption key and the decryption key are updated according to the predetermined time period, the computing device can directly obtain the decryption key of the precedent period as the specified decryption key. If the predetermined time period is not set in the computing device and the control terminal, it may be queried to acquire the decryption key generated when the encrypted control command is received last time, and the acquired decryption key is used as the specified decryption key. In some embodiments, the computing device may determine the target period corresponding to the receiving time of the encrypted control command and acquire the specified decryption key corresponding to an earlier period preceding to the target period (e.g., the second period before the target period, the third period before the target period, etc.).

In step 309, the computing device may decrypt the encrypted control command based on the specified decryption key, and when the encrypted control command is successfully decrypted based on the specified decryption key, step 310 may be performed. When the encrypted control command fails to be decrypted based on the specified decryption key, the following steps 311 to 313 may be performed.

In certain embodiments, the computing device decrypts the encrypted control command based on the specified decryption key. When the decryption is successful, the computing device may acquire and execute the control command, that is, step 310 may be performed. If a decryption failure occurs, the computing device determines that the presently received encrypted control command is invalid, and needs to request the encrypted control command from the control terminal again, that is, steps 311 to 313 may be performed.

In step 310, when the computing device successfully decrypts the encrypted control command based on the specified decryption key, it may execute the control command.

In certain embodiments of the present disclosure, when the computing device successfully decrypts the encrypted control command based on the specified decryption key, the computing device may acquire the control command and perform the corresponding operation according to the control command.

It should be noted that if the computing device successfully decrypts the encrypted control command based on the specified decryption key, it may indicate that the control command in the encrypted control command is valid, and the computing device may directly execute the acquired control command without performing the following steps 311 to 313.

In step 311, when the computing device fails to decrypt the encrypted control command based on the specified decryption key, the computing device may return an invalidity notification to the control terminal.

In certain embodiments, the invalidity notification may carry a command identifier of the encrypted control command that has failed to be decrypted. When the computing device fails to decrypt the encrypted control command based on the specified decryption key, the computing device may obtain the command identifier of the encrypted control command, generate an invalidity notification carrying the command identifier, and return the invalidity notification to the control terminal, so that the control terminal can determine the control command according to the command identifier in the invalidity notification, and replenish the computing device with the encrypted control command.

In step 312, the control terminal may receive the invalidity notification returned by the computing device, determine a specified control command based on the command identifier of the invalidity notification, where the specified control command is the control command carried in the encrypted control command that has failed to be decrypted.

In certain embodiments, after receiving the invalidity notification returned by the computing device, the control terminal may first extract the command identifier in the invalidity notification; next, according to the command identifier, determine the control command corresponding to the command identifier, and use the control command as the specified control command.

In step 313, the control terminal may encrypt the specified control command, generate a specified encrypted control command, and transmit the specified encrypted control command to the computing device.

In certain embodiments, in order to ensure the security of the specified control command during the transmission process, after obtaining the specified control command, the control terminal may encrypt the specified control command, generate a specified encrypted control command, and transmit the specified encrypted control command to the computing device.

It should be noted that, when the control terminal encrypts the specified control command, the control terminal may determine the encryption key according to the present time, and encrypt the specified control command using the encryption key. The process of determining the encryption key is the same as the process shown in the foregoing steps 301 to 302. The process of encrypting the specified control command by the control terminal is the same as the process shown in the foregoing step 303, and details are not described herein. In some embodiments, the computing device can directly determine the decryption key after receiving the specified encrypted control command, and a time stamp can further be added in the specified encrypted control command. The time stamp is not specifically limited.

When the computing device receives the specified encrypted control command, step 304 to step 306 can be performed again, and the computing device decrypts the specified encryption control command. When the specified encrypted control command is successfully decrypted, the foregoing step 307 is performed. When the decryption of the specified encrypted control command fails, the foregoing steps 308 to 311 are performed.

In the examples illustrating the command transmission method above, a user sends out a control command to add a transaction to a blockchain. Instead of sending the control command directly to the computing device for execution, the control terminal receives the control command, acquires an encryption key according to the present time, encrypts the control command by using the encryption key, generates an encrypted control command, and transmits the encrypted control command to the computing device, where the encrypted control command is decrypted, and the control command is executed. That is, in embodiments of the present disclosure, the encryption key can change over time. As a result, a malicious user cannot easily decrypt the encrypted control command by using a fixed password, and the computing device is not easily controlled by the malicious user, thereby ensuring the normal operations of the computing device and improving the processing efficiency of the computing device.

Figure 4A:
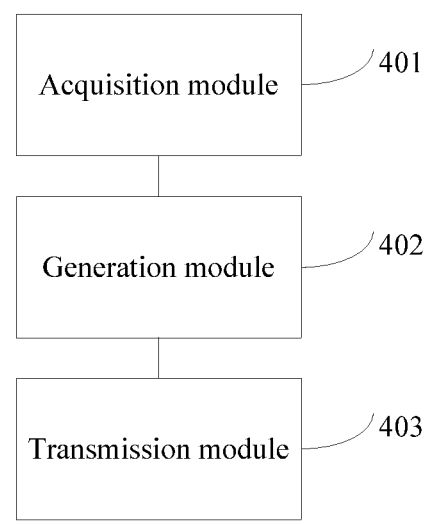
FIG. 4A is a block diagram of a command transmission apparatus according to an exemplary embodiment.

FIG. 4A is a block diagram of a command transmission apparatus, according to an exemplary embodiment. Referring to FIG. 4A, the apparatus includes an acquisition module 401, a generation module 402, and a transmission module 403.

The acquisition module 401 is configured to acquire an encryption key according to a present time. The generation module 402 is configured to encrypt a control command based on the encryption key to generate an encrypted control command. The transmission module 403 is configured to transmit the encrypted control command to a computing device, so that the computing device decrypts the encrypted control command and executes the control command.

In certain embodiments, the command transmission apparatus acquires an encryption key according to the present time, encrypts the control command by using an encryption key, generates an encrypted control command, and transmits the encrypted control command to the computing device. The encrypted control command is decrypted, and the control command is executed by the computing device. As a result, the encryption key can change over time, a malicious user cannot easily decrypt the encrypted control command by using a fixed password, and the computing device is not easily controlled by the malicious user, thereby ensuring the normal operations of the computing device and improving the processing efficiency of the computing device.

Figure 4B:
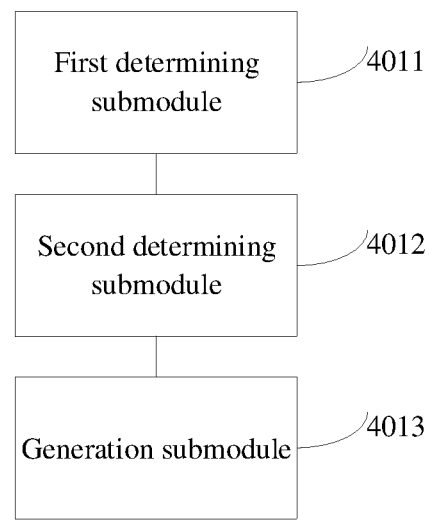
FIG. 4B is a block diagram of a command transmission apparatus according to an exemplary embodiment.

In certain embodiments, referring to FIG. 4B, the acquisition module 401 may include a first determining submodule 4011, a second determining submodule 4012, and a generation submodule 4013.

The first determining submodule 4011 is configured to determine a present time when a user request to send a control command is detected. The second determining submodule 4012 is configured to determine an initial encryption key according to the present time. The generation submodule 4013 is configured to process the initial encryption key to generate an encryption key based on a first algorithm, where the first algorithm includes at least a hash algorithm.

Figure 4C:
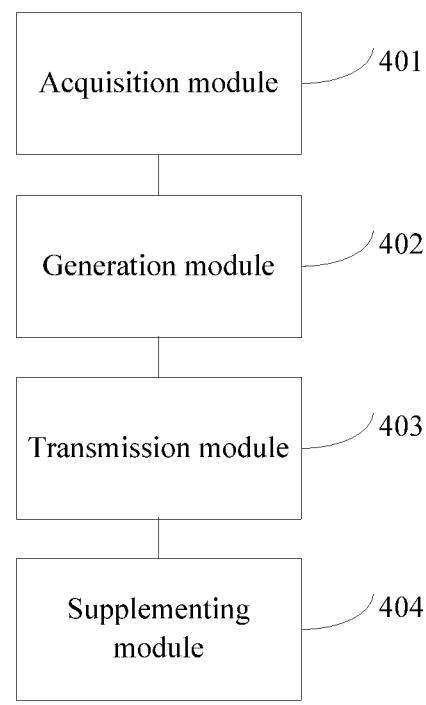
FIG. 4C is a block diagram of a command transmission apparatus according to an exemplary embodiment.

In certain embodiments, referring to FIG. 4C, the apparatus further includes a supplementing module 404. The supplementing module 404 is configured to add a time stamp to the encrypted control command Correspondingly, the transmission module 403 is further configured to transmit the encrypted control command and the time stamp to the computing device.

Figure 4D:
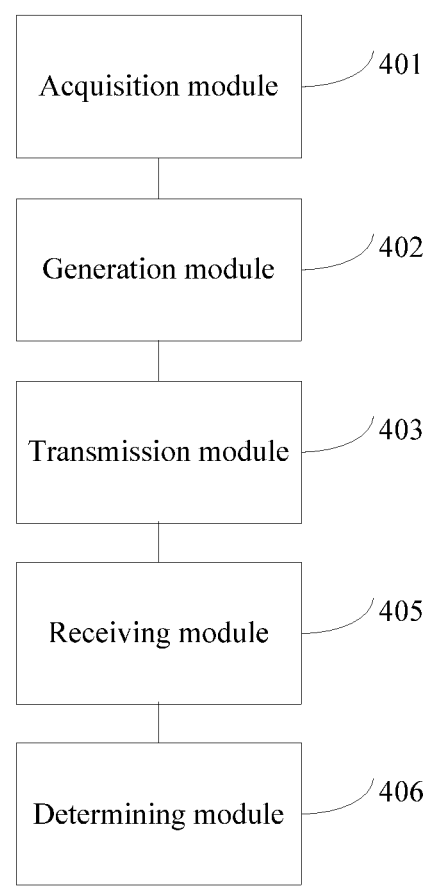
FIG. 4D is a block diagram of a command transmission apparatus according to an exemplary embodiment.

In certain embodiments, referring to FIG. 4D, the apparatus further includes a receiving module 405 and a determining module 406. The receiving module 405 is configured to receive an invalidity notification returned by the computing device, where the invalidity notification is sent by the computing device after the decryption of the encrypted control command fails, and the invalidity notification carries a command identifier of the encrypted control command that has failed to be decrypted. The determining module 406 is configured to determine, according to the command identifier of the invalidity notification, a specified control command, where the specified control command is a control command carried in the encrypted control command that has failed to be decrypted. The generation module 402 is further configured to encrypt the specified control command to generate a specified encrypted control command.

The transmission module 403 is further configured to transmit the specified encrypted control command to the computing device, so that the computing device decrypts the specified encrypted control command, and executes the specified control command carried by the specified encrypted control command.

Figure 5A:
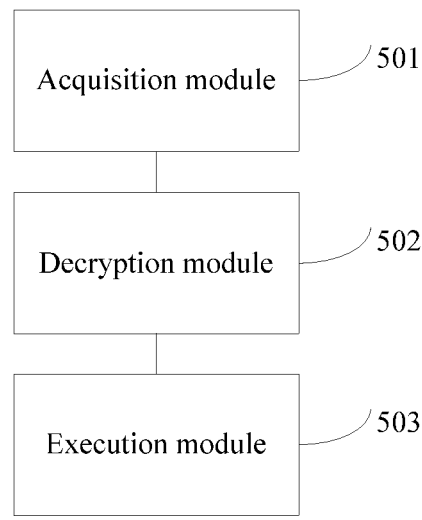
FIG. 5A is a block diagram of a command transmission apparatus according to an exemplary embodiment.

FIG. 5A is a block diagram of a command transmission apparatus according to an exemplary embodiment. Referring to FIG. 5A, the apparatus includes an acquisition module 501, a decryption module 502, and an execution module 503.

The acquisition module 501 is configured to: when receiving the encrypted control command, acquire a decryption key, where the encrypted control command carries a control command, and the encrypted control command is generated by the control terminal and transmitted to the computing device; the decryption module 502 is configured to decrypt the encrypted control command based on the decryption key. The execution module 503 is configured to obtain the control command and execute the control command when the encrypted control command is successfully decrypted based on the decryption key.

In certain embodiments, when receiving the encrypted control command, the computing device decrypts the encrypted control command by using the decryption key, obtains a control command, and executes the control command, so that the computing device only performs commands that have been successfully decrypted. As a result, the computing device is not easily controlled by malicious users, which ensures the normal operations of the computing device and improves the processing efficiency of the computing device.

Figure 5B:
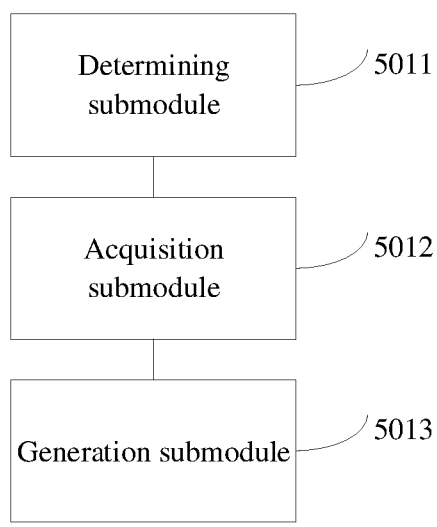
FIG. 5B is a block diagram of a command transmission apparatus according to an exemplary embodiment.

In certain embodiments, referring to FIG. 5B, the acquisition module 501 includes a determining submodule 5011, an acquisition submodule 5012, and a generation submodule 5013. The determining submodule 5011 is configured to determine, when the encrypted control command is received, the receiving time of the encrypted control command. The acquisition submodule 5012 is configured to acquire an initial decryption key according to the receiving time. The generation submodule 5013 is configured to process the initial decryption key based on a second algorithm to generate a decryption key, where the second algorithm includes at least a hash algorithm.

Figure 5C:
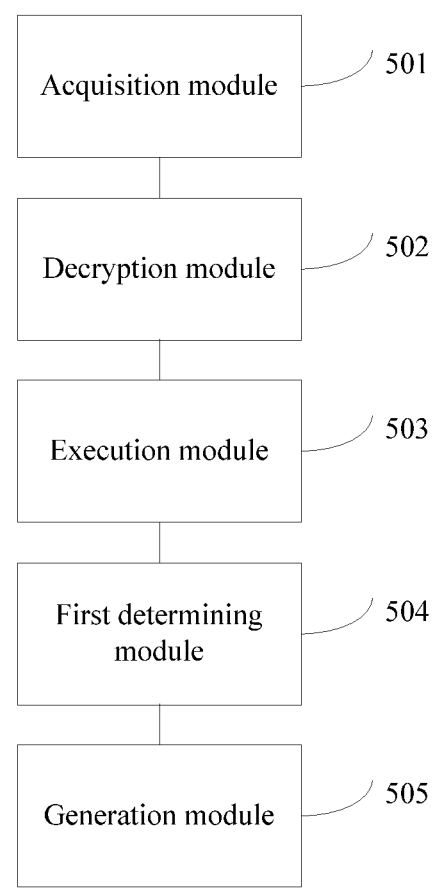
FIG. 5C is a block diagram of a command transmission apparatus according to an exemplary embodiment.
Figure 5D:
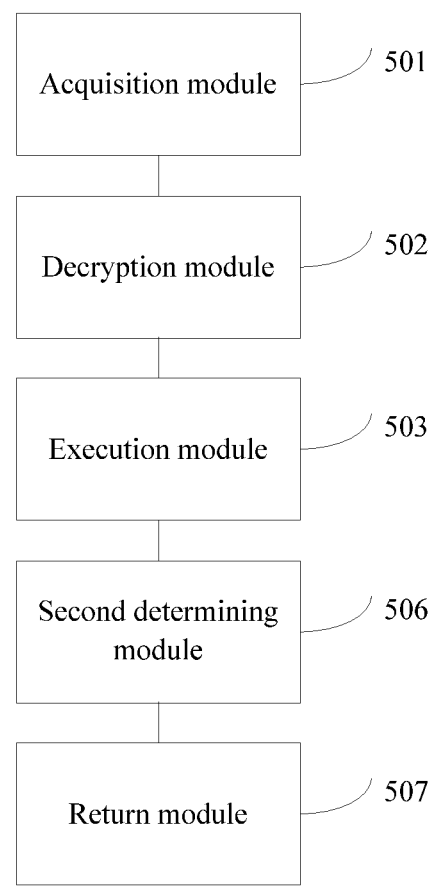
FIG. 5D is a block diagram of a command transmission apparatus according to an exemplary embodiment.

In certain embodiments, referring to FIG. 5C, the apparatus further includes a first determining module 504 and a generation module 505. The first determining module 504 is configured to determine an initial decryption key based on a time stamp when receiving the encrypted control command and the time stamp. The generation module 505 is configured to process the initial decryption key to generate a decryption key based on a second algorithm, where the second algorithm includes at least a hash algorithm.

In certain embodiments, the apparatus further includes a second determining module 506 and a return module 507. The second determining module 506 is configured to determine, when the encrypted control command fails to be decrypted based on the decryption key, a target period corresponding to the receiving time of the encrypted control command.

The acquisition module 501 is further configured to acquire a specified decryption key corresponding to a precedent period of the target period, and decrypt the encrypted control command based on the specified decryption key.

The execution module 503 is further configured to execute the control command when the encrypted control command is successfully decrypted based on the specified decryption key.

The return module 507 is configured to: when the encrypted control command fails to be decrypted based on the specified decryption key, return an invalidity notification to the control terminal, so that the control terminal sends the encrypted control command to the computing device again according to the received invalidity notification. The invalidity notification carries the command identifier of the encrypted control command that has failed to be decrypted.

Regarding the apparatus in the above embodiments, the specific manner in which the respective modules perform the operations has been described in detail in the embodiments related to the method, and will not be explained in detail herein.

Figure 6:
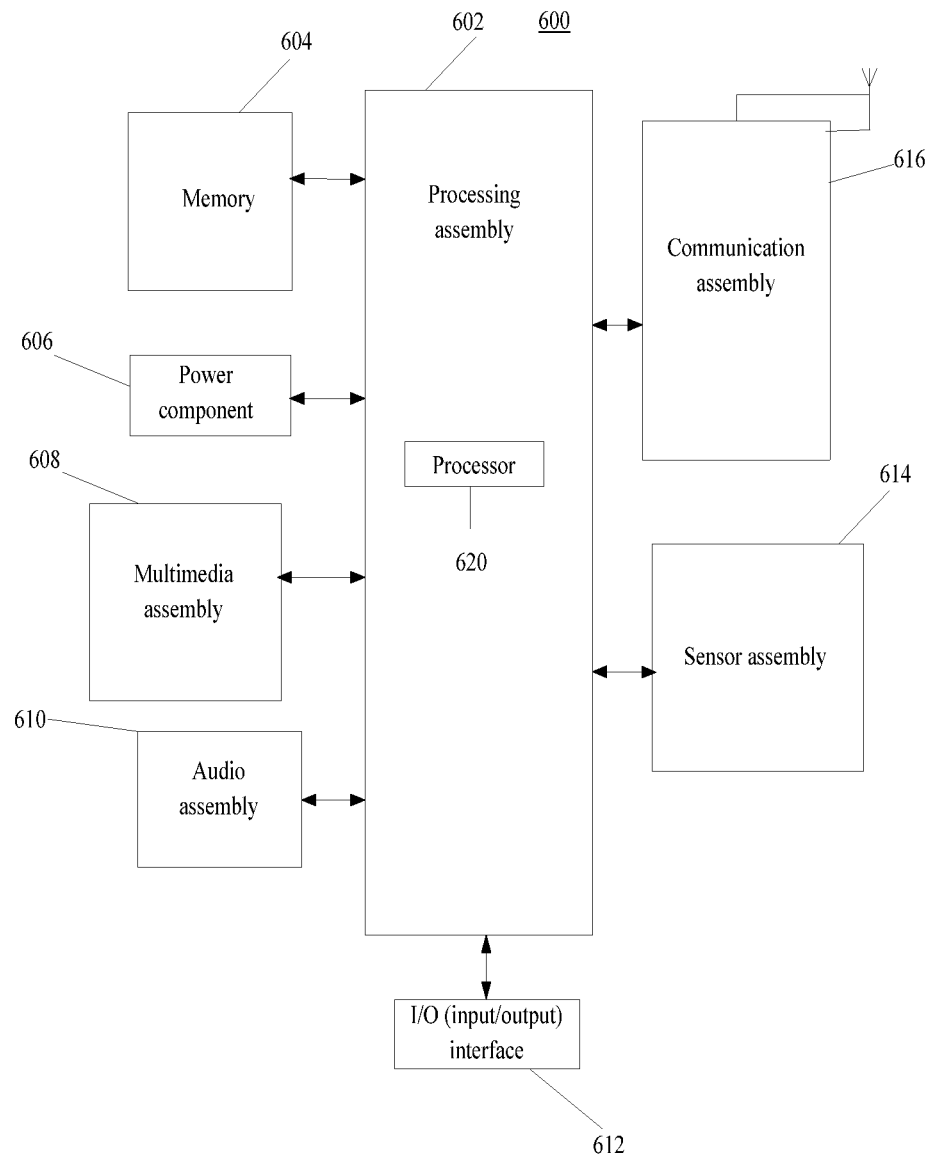
FIG. 6 is a block diagram of a command transmission apparatus according to an exemplary embodiment.

FIG. 6 is a block diagram of a command transmission apparatus 600 according to an exemplary embodiment. For example, the apparatus 600 may be a mobile phone, a computer, a digital broadcast terminal, a messaging device, a gaming console, a tablet device, a medical device, a fitness device, a personal digital assistant, and so on.

Referring to FIG. 6, the apparatus 600 may include one or more of the following components: a processing assembly 602, a memory 604, a power component 606, a multimedia assembly 608, an audio assembly 610, an I/O (input/output) interface 612, a sensor assembly 614, and a communication assembly 616.

The processing assembly 602 typically controls the overall operations of the apparatus 600, such as operations associated with display, telephone calls, data communications, camera operations, and recording operations. The processing assembly 602 may include one or more processors 620 to execute instructions to perform all or part of the steps of the above-described methods. Moreover, the processing assembly 602 can include one or more modules to facilitate interaction between the processing assembly 602 and other components. For example, the processing assembly 602 can include a multimedia module to facilitate interaction between the multimedia assembly 608 and the processing assembly 602.

The memory 604 is configured to store various types of data to support operations at the apparatus 600. Examples of such data include instructions for any application or method operating on apparatus 600, contact data, phone book data, messages, pictures, videos, and the like. The memory 604 can be implemented by any type of volatile or non-volatile storage device or a combination thereof, such as a SRAM (Static Random-Access Memory), a EEPROM (Electrically- Erasable Programmable Read-Only Memory), a EPROM (Erasable Programmable Read Only Memory), a PROM (Programmable Read-Only Memory), a ROM (Read-Only Memory), a magnetic memory, a flash memory, a disk or an optical disk.

The power component 606 provides power to various components of the apparatus 600. The power component 606 can include a power management system, one or more power sources, and other components associated with generating, managing, and distributing power for the apparatus 600.

The multimedia assembly 608 may include a screen between the apparatus 600 and the user that provides an output interface. In some embodiments, the screen may include an LCD (Liquid Crystal Display) and a TP (Touch Panel). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some embodiments, the multimedia assembly 608 includes a front camera and/or a rear camera. When the apparatus 600 is in an operational mode, such as a video-recording mode, the front camera and/or the rear camera can receive external multimedia data. Each front and rear camera can be a fixed optical lens system or have focus and optical zoom capabilities.

The audio assembly 610 is configured to output and/or input an audio signal. For example, the audio assembly 610 includes a MIC (Microphone) that is configured to receive an external audio signal when the apparatus 600 is in an operational mode, such as a call mode, a recording mode, and a voice recognition mode. The received audio signal may be further stored in memory 604 or transmitted via the communication assembly 616. In some embodiments, the audio assembly 610 further includes a speaker for outputting an audio signal.

The I/O interface 612 provides an interface between the processing assembly 602 and a peripheral interface module, which may be a keyboard, a click wheel, a button, or the like. The button may include, but are not limited to, a home button, a volume button, a start button, and a lock button.

The sensor assembly 614 includes one or more sensors for providing a status assessment of various aspects of the apparatus 600. For example, the sensor assembly 614 can detect an on/off state of the apparatus 600, a relative positioning of the components, such as a display and a keypad of the apparatus 600. The sensor assembly 614 can also detect a change in position of the apparatus 600 or a components of the apparatus 600, the presence or absence of contact by the user with the apparatus 600, the orientation or acceleration/deceleration of the apparatus 600 and the temperature change of the apparatus 600. The sensor assembly 614 may include a proximity sensor configured to detect the presence of nearby objects without any physical contact. The sensor assembly 614 may further include a light sensor, such as a CMOS (Complementary Metal Oxide Semiconductor) or a CXD (Charge-coupled Device) image sensor for use in imaging applications. In some embodiments, the sensor assembly 614 may further include an acceleration sensor, a gyro sensor, a magnetic sensor, a pressure sensor, or a temperature sensor.

The communication assembly 616 is configured to facilitate wired or wireless communication between the apparatus 600 and other devices. The apparatus 600 can access a wireless network based on a communication standard, such as WiFi, 2G or 3G, or a combination thereof. In an exemplary embodiment, the communication assembly 616 receives broadcast signals or broadcast associated information from an external broadcast management system via a broadcast channel In an exemplary embodiment, the communication assembly 616 further includes an NFC (Near Field Communication) module to facilitate short-range communication. For example, the NFC module can be based on RFID (Radio Frequency Identification) technology, IrDA (Infra-red Data Association) technology, UWB (Ultra Wideband) technology, BT (Bluetooth) technology and others.

In an exemplary embodiment, the apparatus 600 may be configured to be implemented by one or more ASICs (Application Specific Integrated Circuits), DSPs (Digital Signal Processors), PLDs (Programmable Logic Devices), FPGAs (Field Programmable Gate Arrays), controllers, microcontrollers, microprocessors or other electronic components for executing the above command transmission method.

In an exemplary embodiment, there is also provided a non-transitory computer readable storage medium including instructions, such as a storage device 604 including instructions. The instructions are executable by the processor 620 of the apparatus 600 to perform the foregoing method. For example, the non-transitory computer readable storage medium may be a ROM, a RAM (Random Access Memory), a CD-ROM (Compact Disc Read-Only Memory), a tape, a floppy disk, and an optical data storage device, etc.

The non-transitory computer-readable storage medium, when the instructions in the storage medium are executed by a processor of the command transmission apparatus, enables the command transmission apparatus to perform the foregoing command transmission method.

In the several embodiments provided in the present disclosure, it should be understood that the disclosed device and method may be realized in other manners. The device embodiments described above are merely exemplary. All functional modules or units in the embodiments of the present disclosure may all be integrated into one processing unit, or each unit may be used as a single unit. Further, the functional modules or units may be implemented by computer executable program instructions stored in a computer readable medium. When executed by one or more processors, the computer executable program instructions may implement the corresponding functions of each module or unit. Two or more units may be integrated into one. The above-integrated unit can either be implemented in the form of hardware, or in the form of hardware combined with software functional units.

The description of the present disclosure has been presented for purposes of illustration and description. Many modifications and variations will be apparent to those skilled in the art. The embodiment is chosen and described in order to best explain the principles and embodiments of the disclosure. It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

What is claimed is:

1. A command transmission method, implemented on a control terminal for transmitting a control command to a computing device, comprising:

acquiring, by the control terminal, an encryption key according to a present time;
generating, by the control terminal, an encrypted control command by encrypting the control command using the encryption key; and
transmitting the encrypted control command to the computing device;
wherein the command transmission method further comprises:
receiving an invalidity notification from the computing device indicating that the computing device fails to decrypt the encrypted control command, wherein the invalidity notification carries a command identifier of the encrypted control command that has failed to be decrypted;
determining a specified control command according to the command identifier carried in the invalidity notification, wherein the specified control command is a control command carried in the encrypted control command that has failed to be decrypted;
encrypting the specified control command to generate a specified encrypted control command;
transmitting the specified encrypted control command to the computing device.

2. The command transmission method according to claim 1, further comprising:
determining the present time when a request to send the control command is detected;
determining an initial encryption key according to the present time; and
generating the encryption key based on a first algorithm and the initial encryption key, wherein the first algorithm comprises a hash algorithm.

3. The command transmission method according to claim 1, further comprising:
adding a time stamp to the encrypted control command before transmitting the encrypted control command to the computing device.

4. The command transmission method according to claim 1, further comprising:
triggering the computing device to decrypt the encrypted control command and execute the control command.

5. An electronic device for transmitting a control command to a computing device, comprising:
at least one processor; and
a memory, communicably connected with the at least one processor, for storing instructions executable by the at least one processor, wherein execution of the instructions by the at least one processor causes the at least one processor to:
acquire an encryption key according to a present time;
generate an encrypted control command by encrypting the control command using the encryption key; and
transmit the encrypted control command to the computing device;
wherein execution of the instructions by the at least one processor causes the at least one processor to further:
receive an invalidity notification from the computing device indicating that the computing device fails to decrypt the encrypted control command, wherein the invalidity notification carries a command identifier of the encrypted control command that has failed to be decrypted;
determine a specified control command according to the command identifier carried in the invalidity notification, wherein the specified control command is a control command carried in the encrypted control command that has failed to be decrypted;
encrypt the specified control command to generate a specified encrypted control command; and
transmit the specified encrypted control command to the computing device.

6. The electronic device according to claim 5, wherein execution of the instructions by the at least one processor causes the at least one processor to further:
determine the present time when a request to send the control command is detected;
determine an initial encryption key according to the present time; and
generate the encryption key based on a first algorithm and the initial encryption key, wherein the first algorithm comprises a hash algorithm.

7. The electronic device according to claim 5, wherein execution of the instructions by the at least one processor causes the at least one processor to further:
add a time stamp to the encrypted control command before transmitting the encrypted control command to the computing device.

8. The electronic device according to claim 5, wherein execution of the instructions by the at least one processor causes the at least one processor to further:
trigger the computing device to decrypt the encrypted control command and execute the control command.

9. An electronic device for obtaining a control command from a control terminal, comprising:
at least one processor; and
a memory, communicably connected with the at least one processor, for storing instructions executable by the at least one processor, wherein execution of the instructions by the at least one processor causes the at least one processor to:
receive an encrypted control command by the computing device, wherein the encrypted control command is generated by a control terminal and carries a control command;
acquire a decryption key by the computing device;
acquire the control command by decrypting the encrypted control command using the decryption key; and
execute the control command by the computing device when the encrypted control command is successfully decrypted;
wherein execution of the instructions by the at least one processor causes the at least one processor to:
determine a receiving time when the encrypted control command is received;
acquire an initial decryption key according to the receiving time; and
process the initial decryption key to generate the decryption key according to a second algorithm, wherein the second algorithm comprises a hash algorithm;
wherein execution of the instructions by the at least one processor causes the at least one processor to further:
determine a target period corresponding to the receiving time when the encrypted control command fails to be decrypted using the decryption key;
determine a precedent period according to the target period;
acquire a specified decryption key corresponding to the precedent period;
decrypt the encrypted control command based on the specified decryption key;
execute the control command when the decryption is successful; and return an invalidity notification to the control terminal, when the decryption fails, to inform the control terminal to send the encrypted control command again, wherein the invalidity notification carries a command identifier of the encrypted control command that has failed to be decrypted.

10. The electronic device according to claim 9, wherein the encrypted control command further carries a time stamp, and execution of the instructions by the at least one processor causes the at least one processor to:

determine an initial decryption key according to the time stamp carried in the encrypted control command; and generate the decryption key according to a second algorithm and the initial decryption key, wherein the second algorithm comprises a hash algorithm.

* * * * *